United States Patent [19]

Oonou et al.

[11] Patent Number: 5,295,371
[45] Date of Patent: Mar. 22, 1994

[54] SINGLE-AND DOUBLE-EFFECT ABSORPTION REFRIGERATOR

[75] Inventors: Masayuki Oonou; Kazuhiro Yoshii, both of Ora, Japan

[73] Assignee: Sanyo Electric Co., Ltd., Osaka, Japan

[21] Appl. No.: 926,360

[22] Filed: Aug. 6, 1992

[51] Int. Cl.[5] .................................... F25B 13/00
[52] U.S. Cl. ................................ 62/476; 62/324.2
[58] Field of Search .................. 62/476, 324.2, 101

[56] References Cited

U.S. PATENT DOCUMENTS

| 3,710,852 | 1/1973 | Porter | 165/62 |
|---|---|---|---|
| 4,100,755 | 7/1978 | Leonard | 62/2 |
| 5,111,670 | 5/1992 | Furukawa et al. | 62/475 |

FOREIGN PATENT DOCUMENTS

1501141  12/1966  Fed. Rep. of Germany ........ 62/476

Primary Examiner—Henry A. Bennet
Assistant Examiner—William C. Doerrler
Attorney, Agent, or Firm—Darby & Darby

[57] ABSTRACT

A single-and double-effect absorption refrigerator comprising a drum including both a preliminary low-temperature regenerator having a low-temperature heat source and a condenser, a piping for low-concentration liquid absorbent extending from an absorber to the preliminary low-temperature regenerator through the pump for low-concentration liquid absorbent, a piping for intermediate-concentration liquid absorbent having a pump for intermediate-concentration liquid absorbent and extending from the preliminary low-temperature regenerator to a high-temperature regenerator, and a pipe for liquid absorbent connecting a part of the piping for intermediate-concentration liquid absorbent provided on a drawing side of the pump for intermediate-concentration liquid absorbent to a pipe for high-concentration liquid absorbent extending from a low-temperature regenerator to a low-temperature heat exchanger.

7 Claims, 3 Drawing Sheets

SINGLE-AND DOUBLE-EFFECT ABSORPTION REFRIGERATOR

BACKGROUND OF THE INVENTION

1. Field of the Invention

The present invention relates generally to an absorption refrigerator and more particularly to a single-and double-effect absorption refrigerator comprising a drum including both a preliminary low-temperature regenerator with a low-temperature heat source and a condenser.

2. Background Art

Japanese examined patent application publication SHO.61-13546 discloses a prior-art single-and double effect absorption refrigerator. A refrigeration-cycle system of this absorption refrigerator comprises a high-temperature regenerator with a high-temperature heat source as a heating source, a low-temperature regenerator, a condenser, an evaporator, an absorber, a low-temperature heat exchanger and a high-temperature heat exchanger. The condenser has an auxiliary regenerator or generator with a low-temperature heat source as a heating source. The top of the auxiliary regenerator has a pipe for low-concentration liquid absorbent connected thereto. The bottom of the auxiliary regenerator has a pipe for high-concentration liquid absorbent connected thereto.

This prior-art absorption refrigerator involves problems in that the size of a drum including the auxiliary regenerator, the low-temperature regenerator and the condenser is large and in that this absorption refrigerator must have both the drum for the auxiliary regenerator, for the low-temperature regenerator and for the condenser instead of a drum for a condenser and for a low-temperature regenerator of a conventional double-effect absorption refrigerator and an additional system piping the elements of this absorption refrigerator and in that single-and double-effect operational modes must be switched by means of operating a control valve and a shut-off valve provided intermediate the piping system. Thus, the structure of this prior-art single-and double-effect absorption refrigerator and the switching between the single-and double-effect operational modes thereof must be complicated.

SUMMARY OF THE INVENTION

Therefore, an object of the present invention is to provide a single-and double-effect absorption refrigerator which has a simplified structure, and single-and double-effect operational modes of which are easily switched, and which prevents a reduction in a pressure in a drum including a low-temperature regenerator and a condenser during single-effect operational mode, and a passing of liquid absorbent and liquid refrigerant into the drum including the low-temperature regenerator and the condenser, and a cavitation in a pump for liquid absorbent to stabilize operation of the refrigerator.

In order to achieve the object, a single-and double-effect absorption refrigerator of a first aspect of the present invention is an improvement in an absorption refrigerator having a first drum including an evaporator and an absorber, a high-temperature regenerator, a second drum including a low-temperature regenerator and a condenser, a low-temperature heat exchanger, a high-temperature heat exchanger, and a pump for low-concentration liquid absorbent, the improvement comprising: a third drum including a preliminary low-temperature regenerator having a low-temperature heat source, and a condenser; a piping for low-concentration liquid absorbent extending from the absorber to the preliminary low-temperature regenerator through the pump for low-concentration liquid absorbent; a piping for intermediate-concentration liquid absorbent having a pump for intermediate-concentration liquid absorbent and extending from the preliminary low-temperature regenerator to the high-temperature regenerator; and a pipe for liquid absorbent connecting a part of said piping for intermediate-concentration liquid absorbent provided on a drawing side of the pump for intermediate-concentration liquid absorbent to a pipe for high-concentration liquid absorbent extending from the low-temperature regenerator to the low-temperature heat exchanger.

Thus, the first aspect of the present invention simplifies the structure of the single-and double-effect absorption refrigerator and facilitates a switching between a single-effect operational mode and a combined single-and double-effect operational mode.

The single-and double-effect absorption refrigerator of the first aspect of the present invention may alternatively be a refrigerator wherein the pipe for liquid absorbent is connected to a portion between the second and third drums which secures a U-seal between the second and third drums, the portion having a lower height than the second drum. This arrangement stabilizes single-effect operational mode of the refrigerator.

A single-and double-effect absorption refrigerator of a second aspect of the present invention is an improvement in an absorption refrigerator having a first drum including an evaporator and an absorber, a high-temperature regenerator, a second drum including a low-temperature regenerator and a condenser, a low-temperature heat exchanger, a high-temperature heat exchanger and a pump for low-concentration liquid absorbent, the improvement comprising: a third drum including a preliminary low-temperature regenerator having a low-temperature heat source, and a condenser; a piping for low-concentration liquid absorbent extending from the absorber to the preliminary low-temperature regenerator through the pump for low-concentration liquid absorbent; a piping for intermediate-concentration liquid absorbent having a pump for intermediate-concentration liquid absorbent and extending from the preliminary low-temperature regenerator to the high-temperature regenerator; a piping for high-concentration liquid absorbent extending from the low-temperature regenerator to the absorber via the low-temperature heat exchanger and having a pump for high-concentration liquid absorbent upstream of the low-temperature heat exchanger; and a pipe for liquid absorbent connecting a drawing side of the pump for high-concentration liquid absorbent to a drawing side of the pump for intermediate-concentration liquid absorbent.

Thus, the single-and double-effect absorption refrigerator of the second aspect of the present invention facilitates a switching between single-effect operational mode and combined single-and double-effect operational mode and stabilizes the single-effect operation.

A single-and double-effect absorption refrigerator of a third aspect of the present invention is an improvement in an absorption refrigerator having a first drum including an evaporator and an absorber, a high-temperature regenerator, a second drum including a low-temperature regenerator and a condenser, a low-temperature heat exchanger, a high-temperature heat exchanger and a pump for low-concentration liquid absorbent, the improvement comprising: a third drum including a preliminary low-temperature regenerator having a low-temperature heat source, and a condenser; a first pipe for liquid refrigerant extending downwards from the condenser of the second drum to the evaporator and having a U-seal provided intermediate the condenser of the second drum and the evaporator; and a second pipe for liquid refrigerant extending downwards from the condenser of the third drum to an upstream side of the U-seal of the first pipe for liquid refrigerant and having a U-seal provided intermediate the condenser of the third drum and the upstream side of the U-seal of the first pipe for liquid refrigerant.

This arrangement prevents a reduction in the pressure in the second drum and shortages in liquid absorbent and in liquid refrigerant during single-effect operational mode.

The single-and double-effect absorption refrigerator of the third aspect of the present invention may alternatively further comprise a communicating portion between the first and second pipes for liquid refrigerant, the communicating portion enabling liquid refrigerant passing downwards through the first pipe for liquid refrigerant upstream of the communicating portion to pass into both the first and second pipes for liquid refrigerant downstream of the communicating portion.

This arrangement prevents shortages in liquid absorbent and in liquid refrigerant during single-effect operational mode and securely liquid-seals the U-seals during combined single-and double-effect operational mode.

When the pump for intermediate-concentration liquid absorbent is off, intermediate-concentration liquid absorbent passes from the preliminary low-temperature regenerator to the absorber through the pipe for intermediate-concentration liquid absorbent, the pipe for liquid absorbent, the piping for high-concentration liquid absorbent and the low-temperature heat exchanger so that the refrigerator operates in single-effect operational mode. On the other hand, when the pump for intermediate-concentration liquid absorbent is on, intermediate-concentration liquid absorbent passes from the preliminary low-temperature regenerator to the high-temperature regenerator through the piping for intermediate-concentration liquid absorbent so that the refrigerator operates in combined single-and double-effect operational mode. Thus, an on or off state of the pump for intermediate-concentration liquid absorbent can easily switch the refrigerator into single-effect operational mode or combined single-and double-effect operational mode.

During single-effect operational mode, the pipe for liquid absorbent arranged below the second drum fully U-seals a fluid communication between the second and third drums to prevent liquid absorbent from passing into the low-temperature regenerator, a large quantity of liquid absorbent from staying therein and a shortage in liquid absorbent in the absorber and thereby stabilize single-effect operation of the refrigerator.

An on state of the pump for high-concentration liquid absorbent passes intermediate-liquid absorbent from the preliminary low-temperature regenerator to the absorbent through the piping for intermediate-concentration liquid absorbent, the pipe for liquid absorbent, the pump for high-concentration liquid absorbent and the piping for high-concentration liquid absorbent to secure liquid absorbent in the absorber and thereby stabilize the single-effect operation of the refrigerator.

During single-effect operational mode, a part of liquid refrigerant which has passed from the condenser of the second upper drum into the first pipe for liquid refrigerant through the U-seals in the first and second pipes for liquid refrigerant is vaporized to prevent a reduction in the pressure in the first upper drum the interior of which communicates with the interior of the first pipe for liquid refrigerant, liquid absorbent and liquid refrigerant from staying in the first upper drum, and shortages in liquid absorbent and liquid refrigerant. On the other hand, during combined single-and double-effect operational mode, liquid refrigerant which has descended from the condenser in the first drum securely liquid-seal the U-seals to stabilize the operation of the refrigerator.

DETAILED DESCRIPTION OF THE PREFERRED EMBODIMENTS

Preferred embodiments of the present invention will be described with reference to the drawings hereinafter.

Figure 1:
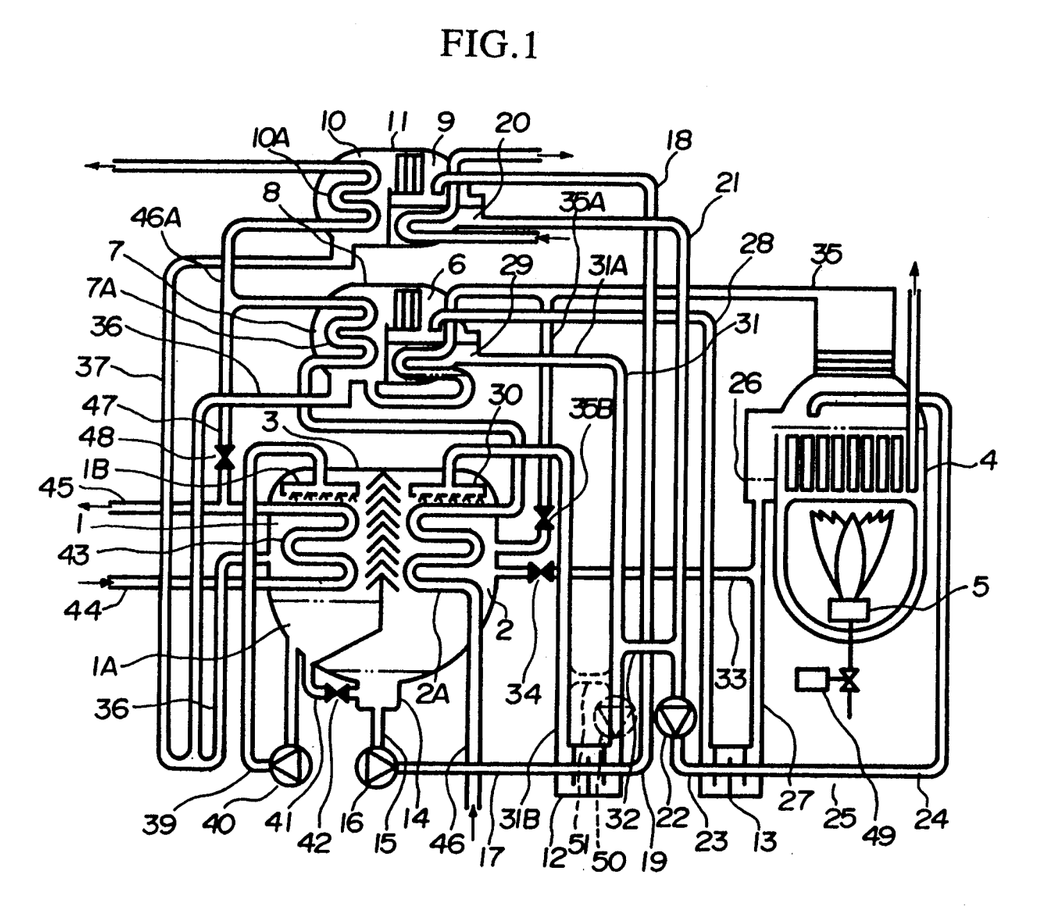
FIG. 1 is a schematic diagram of a single-and double-effect absorption type water cooling and heating apparatus according to a first embodiment of the present invention.

FIG. 1 illustrates a single-and double-effect absorption type water cooling and heating apparatus according to a first embodiment of the present invention. This water cooling and heating apparatus employs, e.g., water as refrigerant and, e.g., lithium bromide (LiBr) as liquid absorbent. An evaporator is indicated at 1. An absorber is indicated at 2. A drum for evaporator and absorber (referred to as lower drum hereinafter) is indicated at 3 and includes the evaporator 1 and the absorber 2. A high-temperature regenerator is indicated at 4 and includes, e.g., a gas burner 5 as a high-temperature heat source. A low-temperature regenerator is indicated at 6. A condenser (referred to as first condenser hereinafter) for the low-temperature regenerator 6 is indicated at 7. A drum for low-temperature regenerator and condenser (referred to as first upper drum hereinafter) is indicated at 8 and includes the low-temperature regenerator 6 and the first condenser 7. A preliminary low-temperature regenerator with a low-temperature heat source is indicated at 9 and includes, e.g., a hot effluent water at, e.g., approximately 80° C. as a low-temperature heat source. A condenser (referred to as second condenser hereinafter) for the preliminary low-temperature regenerator 9 is indicated at 10. A drum for the preliminary low-temperature regenerator and for the condenser (referred to as second upper drum hereinafter) is indicated at 11 and includes the preliminary low-temperature regenerator 9 and the second condenser 10. A low-temperature heat exchanger is indicated at 12. A high-temperature heat exchanger is indicated at 13.

A reservoir for low-concentration liquid absorbent indicated at 14 is provided in the bottom of the absorber 2 or lower drum 3. A piping 19 for low-concentration liquid absorbent of a pipe 15 for low-concentration liquid absorbent, a pump 16 for low-concentration liquid absorbent, pipes 17 and 18 for low-concentration liquid absorbent connects the reservoir 14 for low-concentration liquid to an upper space for vapor phase in the preliminary low-temperature regenerator 9 in the second upper drum 11. A piping 25 for intermediate-concentration liquid absorbent of an pump 22 for intermediate-concentration liquid absorbent and pipes 21, 23 and 24 for intermediate-concentration liquid absorbent connects a reservoir 20 for intermediate-concentration liquid absorbent provided in a lower portion of the second upper drum 11 to a space for a vapor phase in the high-temperature regenerator 4.

A reservoir for intermediate-concentration liquid absorbent indicated at 26 is provided in the high-temperature regenerator 4. Pipes 27 and 28 for intermediate-concentration liquid absorbent connect the interior of the reservoir 26 for intermediate-concentration liquid absorbent to a space for vapor phase in the low-temperature regenerator 6. A piping 31 for high-concentration liquid absorbent of pipes 31A and 31B for high-concentration liquid absorbent connects a reservoir 29 for high-concentration liquid absorbent provided in a lower portion of the first upper drum 8 below the low-temperature regenerator 6 to a sprinkler 30 for high-concentration liquid absorbent provided in an upper portion of the absorber 2. A horizontal pipe 32 for liquid absorbent connects the pipe 21 for intermediate-concentration liquid absorbent on a drawing side of the pump 22 for intermediate-concentration liquid absorbent to the pipe 31A for high-concentration liquid absorbent upstream of the low-temperature heat exchanger 12. The pipe 32 for liquid absorbent has a lower height than the first upper drum 8 and is connected to such places of the pipe 21 for intermediate-concentration liquid absorbent and the pipes 31A for high-concentration liquid absorbent that the pipe 32 for liquid absorbent can U-seal a communication between the first upper drum 8 and the second upper drum 11 even if pressures in the first and second upper drums 8 and 11 differ from each other.

A pipe for intermediate-concentration liquid absorbent is indicated at 33 and connects the pipe 27 for intermediate-concentration liquid absorbent provided upstream of the high-temperature heat exchanger 13 to the absorber 2. A shut-off valve indicated at 34 is provided intermediate the pipe 33 for intermediate-concentration liquid absorbent. The shut-off valve 34 is shut when supplying cold water and opened when supplying hot water.

A pipe for refrigerant indicated at 35 connects a space for vapor phase in the high-temperature regenerator 4 to the first condenser 7 through the low-temperature regenerator 6. A pipe for refrigerant vapor indicated at 35A connects a part of the pipe 35 for refrigerant on an inlet side of the low-temperature regenerator 6 to the absorber 2. The pipe 35A for refrigerant vapor has a shut-off valve 35B provided thereintermediate. A first pipe for liquid refrigerant indicated at 36 connects the first condenser 7 to the evaporator 1. A second pipe for liquid refrigerant indicated at 37 connects the second condenser 10 to a bottom end of the first pipe 36 for liquid refrigerant. A pipe for circulating liquid refrigerant indicated at 39 connects a liquid refrigerant reservoir 1A of the evaporator 1 to a refrigerant sprinkler 1B of the evaporator 1. The pipe 39 for circulating liquid refrigerant has a pump 40 for refrigerant provided thereintermediate. A drain pipe for liquid refrigerant indicated at 41 connects the reservoir 1A for liquid refrigerant to the reservoir 14 for low-concentration liquid absorbent. The drain pipe 41 for liquid refrigerant has a shut-off valve 42 provided thereintermediate.

A cold-and hot-waters heat exchanger indicated at 43 is provided in the evaporator 1 and has a pipe 44 for receiving cold water and a pipe 45 for supplying hot water. A piping for cooling water indicated at 46 constitutes a cooling water circuit from a cooling tower (not shown) back to the cooling tower sequentially through a heat exchanger 2A of the absorber 2, a heat exchanger 7A of the first condenser 7 and a heat exchanger 10A of the second condenser 10. A pipe for cooling water indicated at 47 connects a pipe 46A for cooling water extending between the heat exchanger 7A of the first condenser 7 and the heat exchanger 10A of the second condenser 10 to the pipe 45 for supplying hot water. During operation of the single-and double-effect absorption type water cooling and heating apparatus, cooling water passes sequentially through the absorber 2, the first condenser 7 and the second condenser 10. A shut-off valve indicated at 48 is provided intermediate the pipe 47 for cooling water. The shut-off valve 48 is opened when the piping 46 for cooling water reserves cooling water during supply of hot water.

A flow control valve for the burner 5 is indicated at 49. The degree of opening of the flow control valve 49 is controlled by the outlet temperature of the cold and hot waters heat exchanger 43.

Operation of the single-and double-effect absorption type water cooling and heating apparatus will be described hereinafter.

(a) Single-Effect Operational Mode

When the preliminary low-temperature regenerator 9 receives a sufficient quantity of heat from a hot effluent water as the low-temperature heat source, the pump 22 for intermediate-concentration liquid absorbent stops. In this case, all of the shut-off valves 34, 35B, 42 and 48 are in closed positions when the cold and hot waters heat exchanger 43 supplies cold water to a load. The pump 16 for low-concentration liquid absorbent and the pump 40 for refrigerant are on. The preliminary low-temperature regenerator 9, the second condenser 10, the evaporator 1, the absorber 2 and the low-temperature heat exchanger 12 constitute a first refrigeration-cycle system. The pump 16 for low-concentration liquid absorbent delivers low-concentration liquid absorbent to the preliminary low-temperature regenerator 9 through the low-temperature heat exchanger 12. The preliminary low-temperature regenerator 9 heats low-concentration liquid absorbent using the hot effluent water to separate refrigerant from low-concentration liquid absorbent.

Intermediate-concentration liquid absorbent to which the preliminary low-temperature regenerator 9 has separated refrigerant from low-concentration liquid absorbent to concentrate passes sequentially through the pipe 21 for intermediate-concentration liquid absorbent, the pipe 32 for liquid absorbent, the pipe 31A for low-concentration liquid absorbent, the low-temperature heat exchanger 12 and the pipe 31B for high-concentration liquid absorbent to the sprinkler 30 for liquid absorbent. The sprinkler 30 for high-concentration liquid absorbent sprinkles intermediate-concentration liquid absorbent in the absorber 2. On the other hand, refrigerant separated by the preliminary low-temperature regenerator 9 passes into the second condenser 10 to be cooled and condensed. Resulting liquid refrigerant passes through the second pipe 37 for liquid refrigerant and the first pipe 36 for liquid refrigerant to the evaporator 1. The pump 40 for refrigerant delivers liquid refrigerant out of the reservoir 1A for liquid refrigerant of the evaporator 1 to the sprinkler 1B. The sprinkler 1B sprinkles liquid refrigerant on the cold and hot waters heat exchanger 43. The cold and hot waters heat exchanger 43 supplies cold water which has been cooled by the heat of vaporization of liquid refrigerant to the load. Refrigerant which has been vaporized by the evaporator 1 passes to the absorber 2 and is absorbed in high-concentration liquid absorbent contained in the absorber 2.

(b) Combined Single-and Double-Effect Operational Mode

When the temperature of the hot effluent water passing through the preliminary low-temperature regenerator 9 lowers under a predetermined level and the outlet temperature of cold water is higher than a predetermined temperature during single-effect operational mode, the pump 22 for intermediate-concentration liquid absorbent and the burner 5 of the high-temperature regenerator 4 are operated. In this case, the absorber 2, the preliminary low-temperature regenerator 9, the high-temperature regenerator 4, the high-temperature heat exchanger 13, the low-temperature regenerator 6, the low-temperature heat exchanger 12, the first condenser 7, the second condenser 10 and the evaporator 1 constitute a second refrigeration-cycle system. The pump 22 for intermediate-concentration liquid absorbent delivers intermediate-concentration liquid absorbent from the preliminary low-temperature regenerator 9 to the high-temperature regenerator 4. The high-temperature regenerator 4 heats intermediate-concentration liquid absorbent to separate refrigerant therefrom. Intermediate-concentration liquid absorbent the concentration of which has been increased by the high-temperature regenerator 4 is delivered to the low-temperature regenerator 6 through the high-temperature heat exchanger 13 as in a conventional double-effect absorption refrigerator. The low-temperature regenerator 6 heats intermediate-concentration liquid absorbent to separate refrigerant therefrom and concentrate intermediate-concentration liquid absorbent. Resulting high-concentration liquid absorbent is delivered to the sprinkler 30 of the absorber 2 through the low-temperature heat exchanger 12. The sprinkler 30 sprinkles high-concentration liquid absorbent on the heat exchanger 2A.

The second condenser 10 condenses refrigerant which has been separated by the preliminary low-temperature regenerator 9. The first condenser 7 condenses refrigerant which has been separated by the low-temperature regenerator 6. Resulting liquid refrigerant passes out of the first condenser 7 and the second condenser 10 to the evaporator 1 through the first and second pipes 36 and 37 for liquid refrigerant and is dispersed in the evaporator 1. Thus, cold water which has been cooled by the cold and hot waters heat exchanger 43 is supplied to the load. Refrigerant vaporized by the evaporator 1 passes into the absorber 2 to be absorbed in high-concentration liquid absorbent in the absorber 2. On the other hand, when the apparatus supplies hot water to the load, all of the shut-off valves 34, 35B, 42 and 48 are opened, high-temperature refrigerant is supplied to the lower drum 3 and hot water is then taken out of the evaporator 1.

In the above first embodiment, adding to the conventional double-effect absorption refrigerator the second upper drum 11 provided above the first upper drum 8 of the conventional double-effect absorption refrigerator, the pipes 17 and 19 for low-concentration liquid absorbent, the pipes 21, 23 and 24 for intermediate-concentration liquid absorbent, the pump 22 for intermediate-concentration liquid absorbent, the second pipe 37 for liquid refrigerant and the pipe 46 for receiving cooling water can easily provide the single-and double-effect absorption type water cooling and heating apparatus without the need for providing a new shut-off valve. In addition, controlling the start and stop of the pump 22 for intermediate-concentration liquid absorbent in response to the performance (i.e. the quantity of heat of the hot effluent water) of the preliminary low-temperature regenerator 9 changes a flow of liquid absorbent in the pipe 32 for liquid absorbent and controls the operation of the high-temperature regenerator 4, so that single-effect operational mode and combined single-and double-effect operational mode of the apparatus of the first embodiment can be easily switched.

In addition, since the apparatus of the first embodiment comprises the pipe 32 for liquid absorbent provided below the first upper drum 8 so as to secure the U-seal between the first and second upper drums 8 and 11 during single-effect operational mode, the apparatus can prevent intermediate-concentration liquid absorbent from passing from the preliminary low-temperature regenerator 9 into the low-temperature regenerator 6 and avoid a possible shortage in low-concentration liquid absorbent in the absorber 2 when a pressure in the first upper drum 8 lowers. Thus, the apparatus of the first embodiment can prevent a possible cavitation in the pump 16 for low-concentration liquid absorbent to stabilize single-effect operation of the apparatus.

Alternatively, the apparatus may comprise a pump 50 for high-concentration liquid absorbent provided intermediate the pipe 31A for high-concentration liquid absorbent upstream of the low-temperature heat exchanger 12, and a pipe 51 for liquid absorbent connecting a part of the pipe 31A for high-concentration liquid absorbent on a drawing side of the pump 50 for high-concentration liquid absorbent to the pipe 31B for high-concentration liquid absorbent, as shown in broken lines of FIG. 1. Thus, the pump 50 for high-concentration liquid absorbent is operated during single-effect operational mode to securely deliver intermediate-concentration liquid absorbent from the preliminary low-temperature regenerator 9 back to the absorber 2 via the pipe 21 for intermediate-concentration liquid absorbent, the pipe 32 for liquid absorbent, the pump 50 for high-concentration liquid absorbent, the low-temperature heat exchanger 12 and the pipe 31B for high-concentration liquid absorbent. The pipe 51 for liquid absorbent can secure the U-seal between the reservoir 29 for high-concentration liquid absorbent of the low-temperature regenerator 6 and avoid the shortage in low-concentration liquid absorbent in the absorber 2 to stabilize single-effect operation of the apparatus.

The first embodiment has described the single-and double-effect absorption type water cooling and heating apparatus which can supply both cold water and hot water. However, a single-and double-effect absorption refrigerator comprising the same second upper drum as the second upper drum 11 of the apparatus of the first embodiment has substantially the same operation and advantage as the apparatus of the first embodiment.

Figure 2:
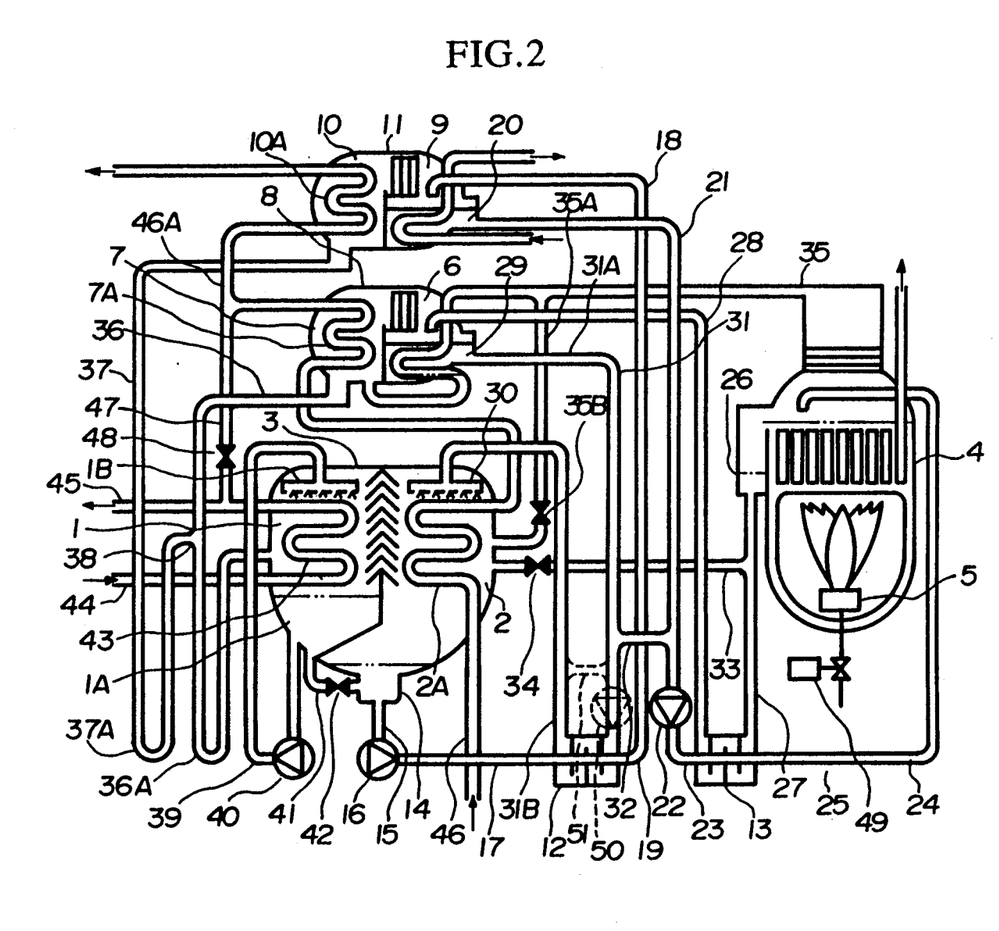
FIG. 2 is a schematic diagram of a single-and double-effect absorption type water cooling and heating apparatus according to a second embodiment of the present invention.

FIG. 2 illustrates a single-and double effect absorption type water cooling and heating apparatus according to a second embodiment of the present invention. The same components of the apparatus according to the second embodiment as those of the apparatus according to the first embodiment have the same labels. Descriptions of these components will not be repeated.

A U-seal indicated at 36A is provided intermediate a first pipe 36 for liquid refrigerant. A U-seal indicated at 37A is provided intermediate a second pipe 37 for liquid refrigerant. The second pipe 37 for liquid refrigerant is connected to an upstream end of the U-seal 36A of the first pipe 36 for liquid refrigerant.

A communicating joint between the first pipe 36 for liquid refrigerant and the second pipe 37 for liquid refrigerant indicated at 38 is provided upstream of and above the U-seal 36A.

Operation of the single-and double-effect absorption type water cooling and heating apparatus according to the second embodiment will be described hereinafter.

(a) Single-Effect Operational Mode

When the preliminary low-temperature regenerator 9 receives a sufficient quantity of heat from a hot effluent water as the low-temperature heat source, the pump 2 for intermediate-concentration liquid absorbent stops. In this case, all of the shut-off valves 34, 35B, 42 and 48 are in closed positions when the cold and hot waters heat exchanger 43 supplies cold water to a load. The pump 16 for low-concentration liquid absorbent and the pump 40 for refrigerant are on. The preliminary low-temperature regenerator 9, the second condenser 10, the evaporator 1, the absorber 2 and the low-temperature heat exchanger 12 constitute a first refrigeration-cycle system. The pump 16 for low-concentration liquid absorbent delivers low-concentration liquid absorbent to the preliminary low-temperature regenerator 9 through the low-temperature heat exchanger 12. The preliminary low-temperature regenerator 9 heats low-concentration liquid absorbent using the hot effluent water to separate refrigerant from low-concentration liquid absorbent.

Intermediate-concentration liquid absorbent to which the preliminary low-temperature regenerator 9 has separated refrigerant from low-concentration liquid absorbent to concentrate passes sequentially through the pipe 21 for intermediate-concentration liquid absorbent, the pipe 32 for liquid absorbent, the pipe 31A for low-concentration liquid absorbent, the low-temperature heat exchanger 12 and the pipe 31B for high-concentration liquid absorbent to the sprinkler 30 for liquid absorbent. The sprinkler 30 for high-concentration liquid absorbent sprinkles intermediate-concentration liquid absorbent in the absorber 2.

On the other hand, refrigerant separated by the preliminary low-temperature regenerator 9 passes into the second condenser 10 to be cooled and condensed. Resulting liquid refrigerant descends through the second pipe 37 for liquid refrigerant and stays in the U-seal 37A of the second pipe 37 for liquid refrigerant. Liquid refrigerant staying in the U-seal 37A overflows outside the communicating joint 38 into the first pipe 36 for liquid refrigerant to stay in the U-seal 36A. Liquid refrigerant staying in the U-seal 36A overflows into the evaporator 1. Part of liquid refrigerant which has passed from the U-seal 37A into the first pipe 36 for liquid refrigerant evaporates, so that a pressure of the resulting refrigerant vapor adds to pressures in the first pipe 36 for liquid refrigerant and in the first drum 8.

The refrigerant pump 40 delivers liquid refrigerant staying in the reservoir 1A for liquid refrigerant of the evaporator 1 to the sprinkler 1B. The sprinkler 1B sprinkles liquid refrigerant on the cold and hot waters heat exchanger 43. The cold and hot water heat exchanger 43 supplies cold water which has been cooled by the heat of vaporization of liquid refrigerant to the load. Refrigerant which has been vaporized by the evaporator 1 passes to the absorber 2 and is absorbed in high-concentration liquid absorbent contained in the absorber 2.

(b) Combined Single-and Double-Effect Operational Mode

When the temperature of the hot effluent water passing through the preliminary low-temperature regenerator 9 lowers under a predetermined level and the outlet temperature of cold water is higher than a predetermined temperature during single-effect operational mode, the pump 22 for intermediate-concentration liquid absorbent and the burner 5 of the high-temperature regenerator 4 are operated. In this case, the absorber 2, the preliminary low-temperature regenerator 9, the high-temperature regenerator 4, the high-temperature heat exchanger 13, the low-temperature regenerator 6, the low-temperature heat exchanger 12, the first condenser 7, the second condenser 10 and the evaporator 1 constitute a second refrigeration-cycle system. The pump 22 for intermediate-concentration liquid absorbent delivers intermediate-concentration liquid absorbent from the preliminary low-temperature regenerator 9 to the high-temperature regenerator 4. The high-temperature regenerator 4 heats intermediate-concentration liquid absorbent to separate refrigerant therefrom. Intermediate-concentration liquid absorbent the concentration of which has been increased by the high-temperature regenerator 4 is delivered to the low-temperature regenerator 6 through the high-temperature heat exchanger 13 as in a conventional double-effect absorption refrigerator. The low-temperature regenerator 6 heats intermediate-concentration liquid absorbent to separate refrigerant therefrom and concentrate intermediate-concentration liquid absorbent. Resulting high-concentration liquid absorbent is delivered to the sprinkler 30 of the absorber 2 through the low-temperature heat exchanger 12. The sprinkler 30 sprinkles high-concentration liquid absorbent on the heat exchanger 2A.

The second condenser 10 condenses refrigerant which has been separated by the preliminary low-temperature regenerator 9. The first condenser 7 condenses refrigerant which has been separated by the low-temperature regenerator 6. Resulting liquid refrigerant passes out of the first condenser 7 and the second condenser 10 to the evaporator 1 through the first and second pipes 36 and 37 for liquid refrigerant and is dispersed in the evaporator 1. Thus, cold water which has been cooled by the cold and hot waters heat exchanger 43 is supplied to the load. Refrigerant vaporized by the evaporator 1 passes into the absorber 2 to be absorbed in high-concentration liquid absorbent in the absorber 2.

On the other hand, when the apparatus supplies hot water to the load, the shut-off valves 34, 35B, 42 and 48 are opened, so that high-temperature refrigerant vapor produced in the high-temperature regenerator 4 passes from the high-temperature regenerator 4 to the lower drum 3 through the pipes 35 and 35A for refrigerant vapor. Refrigerant vapor in the lower drum 3 heats hot water passing through the cold and hot waters heat exchanger 43. Heated hot water is supplied to the load. On the other hand, liquid refrigerant which has been produced by the cold and hot waters heat exchanger 43 and stayed in the reservoir 1A for liquid refrigerant passes into the reservoir 14 for low-concentration liquid absorbent through the drain pipe 41 for liquid refrigerant.

In the second embodiment, the second upper drum 11 is provided separately from the first upper drum 8 of a conventional double-effect absorption type water cooling and heating apparatus and fluidly connected to the appropriate portions of the double-effect absorption type water cooling and heating apparatus to readily transform the double-effect absorption type water cooling and heating apparatus into the single-and double-effect absorption type water cooling and heating apparatus. In addition, since the second pipe 37 for liquid refrigerant including the U-seal 37A and extending from the second condenser 10 to the first pipe 36 for liquid refrigerant is adjoined to the upstream top end of the U-seal 36A of the first pipe 36 for liquid refrigerant and the U-seals 36A and 37A securely seal fluid communications between each of the first and second upper drums 8 and 11, and the lower drum 3 and prevent a pressure drop in the first upper drum 8 due to an evaporation of liquid refrigerant which has passed from the second pipe 37 for liquid refrigerant into the first pipe 36 for liquid refrigerant during single-effect operational mode. This prevents liquid absorbent from staying in the low-temperature regenerator 6 of the first upper drum 8, and liquid refrigerant from staying in the first condenser 7, a shortage in liquid refrigerant in the evaporator 1, a shortage in liquid absorbent in the absorbent 2, and cavitations in the pump 16 for low-concentration liquid absorbent and in the pump 40 for liquid refrigerant, so that single-effect operation of the apparatus can be stabilized. Alternatively, attachments of the pump 50 for high-concentration liquid absorbent and the pipe 51 for liquid absorbent, as shown in broken lines of FIG. 2, to the apparatus of the second embodiment have substantially the same performance as the apparatus according to the second embodiment.

Figure 3:
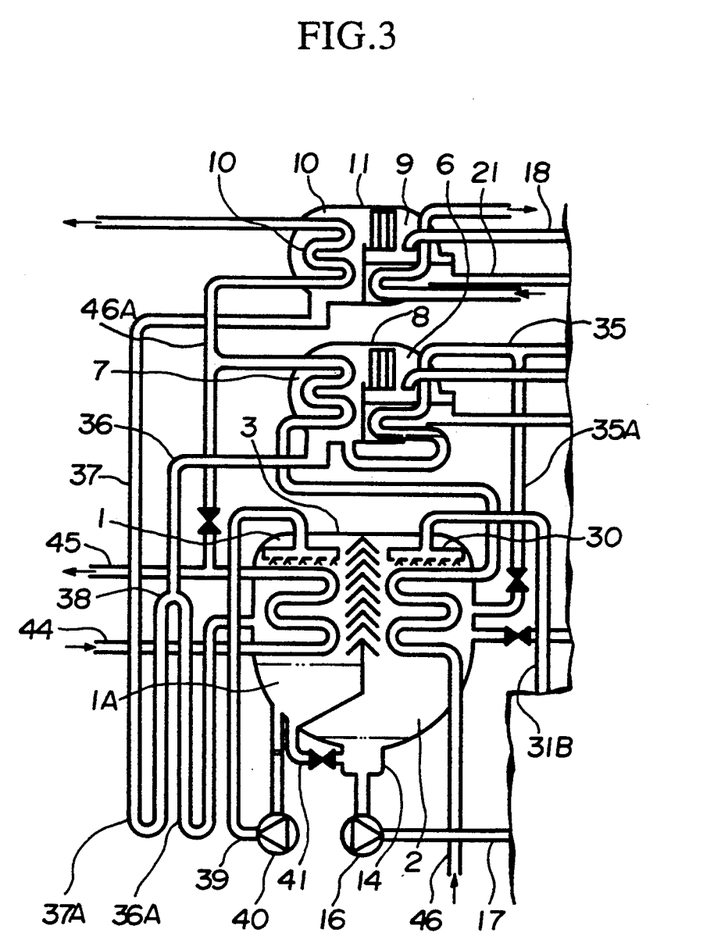
FIG. 3 is a schematic diagram of a main part of a single-and double-effect absorption type water cooling and heating apparatus according to a third embodiment of the present invention.

FIG. 3 illustrates a main part of a single-and double-effect absorption type water cooling and heating apparatus according to a third embodiment of the present invention. The same components of the apparatus according to the third embodiment as those of the apparatuses according to the first and second embodiments have the same labels. Descriptions of these components will not be repeated. Parts of a first pipe 36 for liquid refrigerant and a second pipe 37 for liquid refrigerant extending downwards from a communicating joint 38 are symmetrically arranged with respect to a downward extension of the axis of an upstream part of the first pipe 36 for liquid refrigerant extending upwards from the communicating joint 38, so that liquid refrigerant descending from the first condenser 7 through the first pipe 36 for liquid refrigerant passes into both U-seals 36A and 37A of the first and second pipes 36 and 37 for liquid refrigerant. Part of liquid refrigerant passing from the U-seal 37A to the U-seal 36A evaporates to prevent a reduction in the pressure in the first upper drum 8, so that the apparatus of the third embodiment has substantially the same operations and advantages as the apparatus of the first embodiment. On the other hand, liquid refrigerant passes from the first condenser 7 to both the U-seals 36A and 37A during combined single-and double-effect operational mode to securely liquid-seal both the U-seals 36A and 37A.

The third embodiment has described the single-and double-effect absorption type water cooling and heating apparatus (one kind of single-and double-effect absorption refrigerator) supplying both cold water and hot water. However, an alternative single-and double-effect absorption refrigerator supplying only cold water and comprising the same first upper drum 11 as in the apparatus according to the third embodiment has substantially the same operations and advantages as the apparatus according to the third embodiment.

The present invention is not rigidly restricted to the embodiments described above. It is to be understood that a person skilled in the art can easily change and modify the present invention without departing from the spirit of the invention defined in the appended claims.

What is claimed is:

1. In an absorption refrigerator having: a first drum including an evaporator and an absorber; a high-temperature regenerator; a second drum including a low-temperature regenerator having a heat source which is vaporized liquid absorbent derived from the high-temperature regenerator and a condenser; a low-temperature heat exchanger; and a pump for circulating low-concentration liquid absorbent, means for effecting a single-and double-effect absorption refrigerator comprising:

a third drum, including a preliminary low-temperature regenerator having a low-temperature heat source and a condenser;

a piping for low-concentration liquid absorbent extending from the absorber to the preliminary low-temperature regenerator through the pump for low-concentration liquid absorbent;

a piping for intermediate-concentration liquid absorbent having a pump for intermediate-concentration liquid absorbent and extending from the preliminary low-temperature regenerator to the high-temperature regenerator;

a pipe for high concentration liquid absorbent extending from said low temperature regenerator to said low-temperature heat exchanger; and a pipe for liquid absorbent connecting a part of said piping for intermediate-concentration liquid absorbent provided on a drawing side of the pump for intermediate-concentration liquid absorbent to said pipe for high-concentration liquid absorbent.

2. The single-and double-effect absorption refrigerator as recited in claim 1, wherein the pipe for liquid absorbent is connected to a portion between the second and third drums which secures a U-seal between the second and third drums, said portion having a lower height than the second drum.

3. In an absorption refrigerator having: a first drum including an evaporator and an absorber; a high-temperature regenerator; a second drum including a low-temperature regenerator having a low-temperature heat source which is vaporized liquid absorbent derived from the high-temperature regenerator and a condenser; a low-temperature heat exchanger; a high-temperature heat exchanger; and a pump for circulating low-concentration liquid absorbent, a single-and double-effect absorption refrigerator comprising:
- a third drum including a preliminary low-temperature regenerator having a low-temperature heat source and a condenser;
- a piping for low-concentration liquid absorbent extending from the absorber to the preliminary low-temperature regenerator through the pump for low-concentration liquid absorbent;
- a piping for intermediate-concentration liquid absorbent having a pump for intermediate-concentration liquid absorbent and extending from the preliminary low-temperature regenerator to the high-temperature regenerator;
- a pipe for high concentration liquid absorbent extending from said low temperature regenerator to said low-temperature heat exchanger; and
- a pipe for liquid absorbent connecting a part of said piping for intermediate-concentration liquid absorbent provided on a drawing side of the pump for intermediate-concentration liquid absorbent to said pipe for high-concentration liquid absorbent.

4. In an absorption refrigerator having: a first drum including an evaporator and an absorber; a high-temperature regenerator; a second drum including a low-temperature regenerator and a condenser; a low-temperature heat exchanger; a high-temperature heat exchanger; and a pump for low-concentration liquid absorbent, a single-and double-effect absorption refrigerator comprising:
- a third drum including a preliminary low-temperature regenerator having a low-temperature heat source, and a condenser;
- a first pipe for liquid refrigerant extending downwards from the condenser in the second drum to the evaporator and having a U-seal provided intermediate the condenser in the second drum and the evaporator; and
- a second pipe for liquid refrigerant extending downwards from the condenser in said third drum to an upstream side of the U-seal of said first pipe for liquid refrigerant and having a U-seal provided intermediate the condenser in said third drum and the upstream side of the U-seal of said first pipe for liquid refrigerant.

5. The single-and double-effect absorption refrigerator as recited in claim 4, further comprising:
- a communicating portion between said first and second pipes for liquid refrigerant, said communicating portion enabling liquid refrigerant passing downwards through said first pipe for liquid refrigerant upstream of said communicating portion to pass into both said first and second pipes for liquid refrigerant downstream of said communicating portion.

6. An absorption refrigerator of claim 1 further comprising:
- a high-temperature heat exchanger; and
- wherein said means for effecting single and double effect operation circulates said liquid absorbent from said absorber, via said pump for low-concentration liquid absorbent, said low-temperature heat exchanger, said preliminary low-temperature regenerator, said pipe for liquid absorbent, said low-temperature heat exchanger, to said absorber when single-effect operation is carried out, and said liquid absorbent is circulated from said absorber, via said pump for low-concentration liquid absorbent, said low-temperature heat exchanger, said preliminary low-temperature regenerator, said pump for intermediate-concentration liquid absorbent, said high-temperature heat exchanger, said high-temperature regenerator, said high-temperature heat exchanger, said low-temperature regenerator, said low-temperature heat exchanger, to said absorber when single-and double-effect operation is carried out.

7. An absorption refrigerator of claim 3 further comprising:
- a high-temperature heat exchanger; and
- wherein said means for effecting single and double effect operation circulates said liquid absorbent from said absorber, via said pump for low-concentration liquid absorbent, said low-temperature heat exchanger, said preliminary low-temperature regenerator, said pipe for liquid absorbent, said low-temperature heat exchanger, to said absorber when single-effect operation is carried out, and said liquid absorbent is circulated from said absorber, via said pump for low-concentration liquid absorbent, said low-temperature heat exchanger, said preliminary low-temperature regenerator, said pump for intermediate-concentration liquid absorbent, said high-temperature heat exchanger, said high-temperature regenerator, said high-temperature heat exchanger said low-temperature regenerator, said low-temperature heat exchanger, to said absorber when single-and double-effect operation is carried out.

* * * * *